Dec. 18, 1956  F. L. KILBOURNE, JR  2,774,621
FLEXIBLE GASKETS
Filed Feb. 1, 1954

INVENTOR
Frederick L. Kilbourne Jr.
BY
ATTORNEYS

United States Patent Office 2,774,621
Patented Dec. 18, 1956

2,774,621

FLEXIBLE GASKETS

Frederick L. Kilbourne, Jr., Woodmont, Conn., assignor to The Connecticut Hard Rubber Company, New Haven, Conn., a corporation of Connecticut Application February 1, 1954, Serial No. 407,525

3 Claims. (Cl. 288—23)

This invention relates to sheathed gaskets, and particularly to gaskets having a core of elastomeric polymethylsiloxane generally referred to as silicone rubber, the sheathing being of a material superior to silicone rubber in some property other than elasticity.

In an application, Serial No. 347,224, filed April 7, 1953, by Robert L. Hibbard and assigned to the same assignee as herein and now abandoned, reference is made to plastic sheathed silicone rubber gaskets suitable for sealing oven doors, refrigerators, aircraft hatchways, fume hoods, and the like. Sheathed gaskets having a sponge rubber core have been proposed for sealing joints involving a relatively small sealing pressure.

Heretofore, silicone rubber has been used for the construction of O-rings, gaskets and related sealing members. Silicone rubber has been the preferred gasket material in certain applications in which high temperature stability, the low temperature flexibility, low compression set, and weathering resistance were sufficiently important to justify the use of materials as costly as silicone rubber.

Heretofore, it has been known that silicone rubber was quite resistant to the effects of chemicals such as vinegar or brine, and to fluids such as castor oil or lard oil. However, silicone rubber has a very poor resistance to materials such as strong acids, strong alkalies, nonneutral solutions as well as aromatic solvents, chlorinated solvents, aviation gasoline, toluene, carbontetrachloride, and perchloroethylene. It is sometimes necessary to pass such materials through regions adjacent the gaskets. By the use of neoprene, butadiene-acrylonitrile copolymer or polysulfide elastomers particularly resistant to the troublesome materials and to the swelling action of such solvents, and by always maintaining the temperature within the range of good elasticity of such rubbers, the solvent-resistant elastomers have been effective in those installations in which wide temperature ranges were not encountered. However, there have been some installations requiring the use of an elastomer or acid-resistant elastomer resistant to chemicals and solvents at extreme temperatures (low temperatures or high temperatures) for which there has been no suitable gasket material. It has been necessary either to use a silicone rubber whereby low temperature resiliency has been achieved without solvent resistance or to use a solvent-resistant hydrocarbon elastomer under modified operating conditions warming the gasket above its brittle temperature.

It is an object of the present invention to provide a gasket resistant to chemicals and solvents and retaining its elasticity and resilience after prolonged exposure to extreme temperatures.

It is an object of the present invention to provide a gasket having good flexibility at low temperature and resistance to oxidation and/or compression set at high temperatures of a silicone rubber gasket and having the solvent resistance and/or chemical resistance of a gasket constructed of an organic macromolecular material highly resistant to chemicals and solvents.

An important feature of the present invention is the utilization of a unique structure for a gasket, whereby all extended surfaces of the gasket are corrugated and provided with closed path grooves and closed path ridges, whereby the gasket can be subjected to any of the deformations which it would encounter in normal use without either increasing or decreasing the perimeter of the gasket. It is a known geometrical principle that a circle presents the minimum perimeter for enclosing a given area of matter. In other words, to distort a solid tubular member of compressible material creates a shape of increased perimeter in order to contain the same volume of rubber or other material forming the core of the tube. In cases where the core happens to be covered by a relatively inextensible sheathing the distortion of the tubular member from its circular cross-section tends to fracture or break the cover member. The constant perimeter feature of the present invention refers to the length of a closed path around the edge of a cross section of such ridges and valleys, which perimeter is substantially constant regardless of the nature of the deformation of the gasket. An important feature of the present invention is the provision of a nonelastic but flexible sheathing on the constant perimeter gasket structure whereby the surface of the silicone gasket is protected from the effects of solvents, acids, alkalies, and/or hydrolytic solutions.

By reason of the constant perimeter feature, attributable to the corrugations or ridges and valleys, the sheathing on the silicone gasket is not cracked or broken during the deformations of the silicone rubber. The sheathing is thus able to protect the silicone rubber core from swelling or attack by fluids whether the gasket is in the shape which it tends to assume prior to or subsequent to the maximum compression to which it is likely to be subjected. The gaskets of the present invention are adapted to be compressed not more than about 40%, and are thus distinguishable from spongy core gaskets, hollow core gaskets, and similar members readily compressed about as much as 90%. Thus the gaskets can exert a very large restoring force effective as a sealing pressure. Similarly the internal pressure tending to burst the sheathing of the compressed gasket is very great.

The constant perimeter of the corrugated gasket is longer than the perimeter of an uncorrugated gasket of the same external dimensions. In the case of a gasket of circular cross section, the perimeter of the corrugated gasket is such that it will allow between 5 and 40 percent squeezing of the gasket in one direction without requiring stretching of the corrugated skin of the gasket. This can be done by providing sufficient corrugated perimeter of the gasket to equal from about 1.025 to about 1.25 times the perimeter of the cross section of a similar but uncorrugated gasket.

In the case of a gasket of rectangular cross section, it will generally be sufficient to corrugate each surface of the gasket to a degree sufficient to provide a perimeter approximately 1.2 times that of the uncorrugated rectangular cross section. This would allow a 20 percent compression of the flat gasket. If the expected direction of compression is known, the corrugations should be positioned to accommodate such compression. The inner and outer edges of a flat gasket would be corrugated to allow bulging of the core without rupture of the shell.

The term "compression set" designates the property of a material tending to make it retain a shape at which it is compressed for a long period of time. For example, a method of testing or measuring compression set is designated as ASTM D395–59t method B. In testing compression set, the sample can be compressed for a period such as 22 hours at a particular temperature. Thereafter, the compression can be withdrawn and the sample allowed to relax to whatever position or formation it can assume at that temperature. Many of the materials which tend to be resistant to solvents have a very high compression set.

A gasket made entirely of polytrifluoromonochloroethylene undergoes a large degree of compression set. This is objectionable in a gasket because it means that, as the gasket relaxes or sets, the bolts or flanges which are tightened against the gasket will loosen, and leakage may occur across the face of the gasket. Another objection to a gasket made of polytrifluorochloroethylene is that it is very hard and stiff; hence, very strong glands, flanges, and bolts are required in order to compress the gasket sufficiently to effect a seal against the metal confining surfaces.

One of the classes of silicone commercially available is designated as a low-compression-set type of silicone rubber. Although its tensile strength and elongation are less than those of other types of silicone rubber, the low-compression-set type of silicone rubber does have a remarkable elastic memory throughout a wide temperature range. Thus, the material regains substantially its initial shape even after being subjected to compression for a long period of time at temperatures over a range from —60 to +350° F.

There have also been available silicone rubbers designed particularly for extremely low temperatures. Such low temperature silicone rubbers have had compression sets which at room temperature were not as low as those of the low-compression-set rubber, but have been superior to the low-compression-set rubber at very low temperature, such as —100° F. In the practice of the present invention, either type of silicone rubber may be employed, according to the use to which the gasket is to be put. Even silicone rubber which is not of the low-compression-set type may be used because such rubbers are often superior in resistance to compression set to other elastomers especially when tested at either very low temperatures (—60° F.) or very high temperatures (200–350° F.).

As previously explained, the present invention relates to a gasket having a core of silicone rubber and an organic sheathing resistant to chemicals and solvents. The sheathing may be of any macromolecular material which has the desired resistance to the materials to which the gasket might be subjected.

Some of the materials which can be advantageously employed as sheathing for a silicone rubber gasket include Thiokol, butadiene-acrylonitrile copolymer rubber, and Kel-F. Thiokol is a polyethylenepolysulfide. Kel-F is a polytrifluorochloroethylene. Teflon, a polytetrafluoroethylene, has a high degree of inertness to organic solvents and may be used as a sheathing although it is formed into an impervious film less readily than Kel-F. The gaskets may have sheathings of polyvinylchloride, polyethylene, nylon, and, in fact, any rubber or plastic which has the desired resistance to the liquids to which it will be exposed. Particularly desirable results are achieved by using a sheathing of polytrifluorochloroethylene. Copolymers of tetrafluoroethylene and trifluorochloroethylene, such as disclosed in Patent 2,662,072, would be advantageous sheathing for a gasket.

The sheathing can be applied to the corrugated gasket by any appropriate bonding procedure. For example, in applying a film of nylon, a solution can be prepared consisting of hot alcohol, water and nylon. Kel-F can be dispersed in xylene to form a suspension. Plasticizers for the Kel-F may also be present in the dispersion. A coating of Kel-F can be formed on the silicone rubber gasket by dipping the gasket in the Kel-F dispersion, allowing it to dry, redipping and obtaining a reasonably thick coating by procedures similar to those employed in the dipping of articles in latex.

The choice of plastic is determined in part by the lowest temperature to which the gasket is to be subjected. Because it is an object of the invention to eliminate the difficulties attributable to the leaching out of plasticizers from macromolecular organic materials, the sheathing is ordinarily formed as an unplasticized film. Because the sheathing contains no plasticizer, the gasket is ordinarily not employed below the brittle point or second-order transition temperature of the sheathing. Unplasticized polyvinylchloride should not be used unless the lowest temperature in normal use would be above 75° C. Polyvinylidenechloride, sold as Saran, is suitable down to —17° C. High-molecular-weight polyethylene has a brittle point of —68.5° C. and, accordingly, is suitable as a sheathing for many low-temperature gaskets. Nylon is available in several forms, some of which have a brittle point as low as —50° C. Kel-F or polytrifluorochloroethylene has remarkable low-temperature properties with a brittle point of —320° F. Teflon or polytetrafluoroethylene is suitable at temperatures as low as —95° F. Copolymers of vinylchloride and vinylidenechloride are suitable as a sheathing if the lowest temperature to be encountered is not greater than —50° F. For moderately elevated temperature use, particular advantages are obtained by sheathing the silicone rubber in glycolterephthalate, available as Mylar. For regular use above 200° C., the sheathing should be of polytetrafluoroethylene, polytrifluorochloroethylene or copolymers thereof. If the sheathed gasket is to be exposed to such fluids as will not extract plasticizer from the sheath, then the sheath may contain plasticizers, thus broadening the temperature range over which it might be used. Thus, a plasticized polyvinylchloride sheated corrugated gasket might be used at temperatures down to 0° F. to protect the silicone core from the action of an alcohol solution containing hydrochloric acid.

Figure 1:
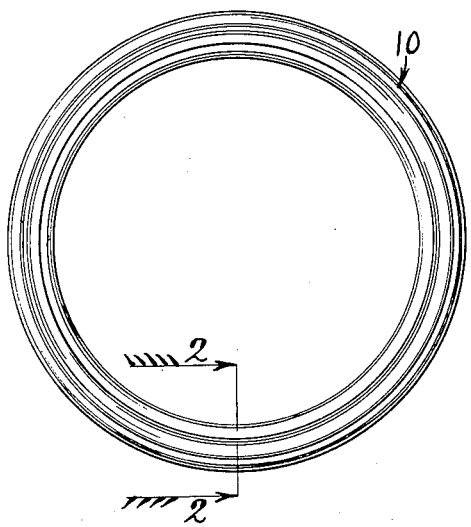
Fig. 1 is a top view of a corrugated O-ring.
Figure 2:
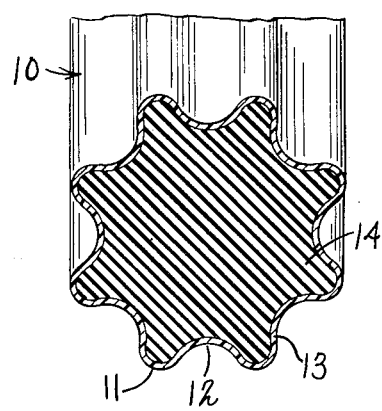
Fig. 2 is a cross section on lines 2—2 of Fig. 1.

As shown in Figs. 1 and 2, an O-ring 10 is constructed, not with the smooth, minimum perimeter surfaces of a conventional O-ring, but instead is provided with ridges 11 and valleys 12 to form what is conventiently designated as a corrugated structure. Each ridge 11 and each valley 12 follows a closed path which is circular with its radius on the axis of the O-ring 10. It is important that the paths of the valleys near the center of the gasket follow a path which is always near the center of the gasket. If this were not so, and if, for example, the valleys 12 followed a spiral path about the O-ring, fluids might escape along such valleys from the inner portion of the gasket to the outer portion thereof.

Particular attention is directed to a sheathing 13 formed from a flexible material resistant to chemicals and/or solvents, and surrounded by a body 14 of the O-ring. As previously explained, the body of the O-ring is constructed of a polydimethylsiloxane elastomer characterized by a relatively low compression set and by a relatively high flexibility at high and/or low temperatures.

Figure 3:
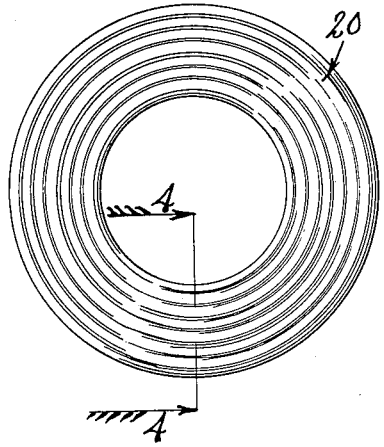
Fig. 3 is a top view of a corrugated rim gasket.
Figure 4:
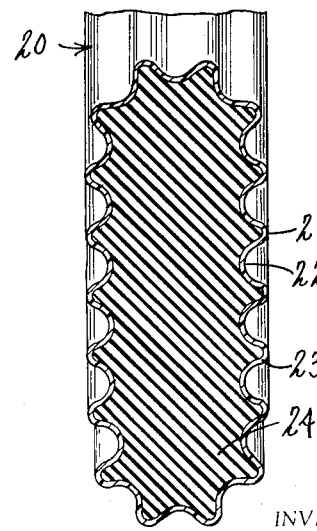
Fig. 4 is a cross section of the flat gasket of Fig. 3 taken on lines 4—4 of Fig. 3.

In Figs. 3 and 4, a flat gasket 20 is provided with ridges 21 and grooves 22 to establish what is conveniently designated as a generally corrugated structure on all extended surfaces of the gasket. If this gasket is compressed or distorted in a manner such as would be encountered in normal use, the perimeter of the gasket is not changed. Thus, the length of an edge of the cross section, such as shown in Fig. 4, is the same whether the gasket retains its normal position or is compressed or otherwise distorted. Because the gasket 20 has the corrugated surfaces, a sheathing 23 constructed of non-elastic organic structural material is positioned over a silicone rubber body 24. When the gasket is compressed, the sides are bulged, but there is no increase of the perimeter of the cross section of the gasket as in the case of a circular constant perimeter gasket. The convolutions of the surface are shifted during compression of the gasket so that the nonelastic sheathing embraces a projected area larger than that of the undeformed gasket.

Several examples are described in order to provide a clearer distinction over prior practices and in order to show some of the possible variations and modifications of gaskets having a corrugated surface protected by an organic nonelastic sheathing.

Example I

A rubber composition was prepared using the silicone rubber designated as extreme low-temperature class of silicone rubber and molded to form an O-ring substantially as shown in Figs. 1 and 2. In a cross section of a segment of the ring, the ridge-to-ridge diameter was 7/32 of an inch. Thus, there was a difference of 7/16 inch between the inside and outside diameters of the entire ring. The inside diameter of the O-ring was 1½ inches; the outside diameter was 1 15/16 inches. There were seven ridges and seven valleys as indicated in Fig. 2. In the cross section, the ridge preferably corresponds generally to an arc of a circle, as is the valley. If desired, each arc may be substantially semicircular, the ridge arc radius being greater than the valley arc.

If the corrugations correspond approximately to semicircular arcs of identical radii (impossible for corrugations on a small circle, but appropriate for gigantic circles or flat gaskets) the corrugations can permit the sheathing to extend to a perimeter 1.57 (i. e., $\pi/2$) times the unextended median perimeter of the sheathing. The corrugations of the present invention are adapted particularly to provide sheathings which, when extended to the limit, would provide a perimeter from 1.05 to 1.40 times the unextended median perimeter of the sheathing. A circle, such as the unextended median circle of Fig. 2, when compressed about 40% to an ellipse having a minor axis 0.6 times the diameter of such median circle, has a perimeter approximately 1.25 times the perimeter of the circle. Particular advantages are obtained by constructing the gasket so that it readily permits merely a 1.25 times increase of perimeter, thereby decreasing the size of the grooves and increasing the relative sizes of the ridges available as primary sealing surfaces. In any event, the radius of the sharpest curve of the corrugations should be more than twice the thickness of the sheathing.

After the corrugated O-ring had been molded and cured, it was provided with a sheathing of polytrifluorochloroethylene. This sheating was applied to the silicone O-ring by dipping it in a dispersion of high-molecular-weight unplasticized Kel-F (trifluorochloroethylene) in xylene. A very thin coating of Kel-F was deposited on the corrugated O-ring upon first immersion and removal from the dispersion. The Kel-F-coated silicone rubber was then heated to a temperature of approximately 450° F. for 30 minutes to fuse the Kel-F film into an impervious uniform film securely bonded to the silicone rubber. After drawing, redipping, baking and repeating the cycle several times, a coating about three mils thick of Kel-F was formed on the silicone rubber.

The sheated O-ring was immersed in petroleum fuel, such as aviation gasoline, and found to have substantially no swelling by reason of the imperviousness of the Kel-F sheathing. The O-ring was employed in an airplane fuel line employed at elevated altitude. In the stratosphere, temperatures of the magnitude of $-65°$ F. are encountered. The O-ring retained its resilient gasket action notwithstanding the very low temperature. Further tests on the O-ring showed that it was flexible when cooled to a temperature as low as $-80°$ F. Moreover, at this low temperature, the gasket could be distorted and compressed without showing any cracking or imperfection in the Kel-F sheathing. A similar O-ring was compressed 20 percent at 165° F. and showed no permanent set nor any cracking of the coating. The Kel-F sheathing not only had good resistance to solvents but also outstanding resistance to chemicals. It was particularly suitable as a gasket for handling 98% white fuming nitric acid. Although a similar sheathing of polytetrafluoroethylene was resistant to some chemicals, it was not impermeable to 98% nitric acid. The fusing of the polytrifluorochloroethylene sheathing helps achieve this advantageous impermeability. The Kel-F sheathing is also impermeable to hydrogen peroxide and related oxidizing agents.

Example II

A flat gasket was prepared similar to that shown in Figs. 3 and 4. The core was constructed of silicone rubber, and a nylon sheathing was applied by dipping the gasket in a solution of nylon in hot aqueous alcohol. The completed gasket was particularly resistant to aviation gasoline and retained its flexibility at temperatures as low as $-65°$ F. even when compressed. Particular attention is directed to the fact that not only the upper and lower surfaces but also the inner and outer edges of the gasket are provided with the ridges and valleys so that all extended surfaces are corrugated.

Example III

A corrugated gasket might be given a coating of glycolterephthalate plastic approximately four mils in thickness. The glycolterephthalate, sometimes referred to as Mylar, has the remarkable advantage of being very adherent to the silicone rubber and of forming a very secure bond to the silicone rubber. Of particular importance, the sheathing of glycolterephthalate has the advantage of withstanding elevated temperatures. Thus, the glycolterephthalate is not softened at temperatures which affect many other plastics, and the sheathed gasket can be employed at temperatures up to about 325° F.

Example IV

A gasket similar to that of Figs. 3 and 4 might be prepared in which the closed paths of the ridges and valleys were not circular, but followed a closed wavy path. It is important that none of the valleys provide a route from the interior to the exterior of the passageway sealed by the gasket, but it is not essential that the closed path of the valley be exactly circular. Such a gasket might be given a coating of unplasticized polyvinylidenechloride approximately six mils thick, and the gasket might be employed between the flanges on a benzene vapor pipe. In the absence of the coating, the benzene would attack the core, causing swelling. In the absence of the corrugations, the polyvinylidenechloride sheathing would be cracked as the perimeter of the gasket was increased by the compression of the gasket.

Example V

A corrugated O-ring similar to that of Figs. 1 and 2 might be prepared having a core of low-temperature silicone rubber, and a sheathing of polytrifluorochloroethylene. The gasket might be employed in a coupling connecting two flexible tubes employed for conducting liquid oxygen from a tank truck to a storage vessel.

Example VI

A corrugated silicone rubber gasket might be provided with a sheathing of polyethylene and employed as a gasket in a supply system for automotive gasoline. The flexibility and fuel-resistance of the gasket would be sufficient to withstand severely cold weather.

Example VII

A corrugated gasket might be provided with a sheathing of polytetrafluoroethylene, sometimes designated as Teflon, by dipping the gasket into a dispersion of Teflon and subsequently baking the gasket to bring about a sintering of the particles of Teflon thus deposited. The gasket would be suitable for resisting liquid ammonia, hydrochloric acid and other chemicals, even at temperatures as low as —95° F. and at temperatures as high as about 500° F.

*Example VIII*

A corrugated gasket might be provided with a sheathing of a copolymer of vinylchloride and vinylidenechloride and employed in fuel-handling systems subject to the wide range of severe weather temperatures.

The examples given are merely for purposes of providing a general understanding of the nature of the invention which is more accurately defined in the appended claims.

The invention claimed is:

1. A gasket constructed principally of cured polydimethylsiloxane elastomer and having around the elastomer a sheathing of a nonelastic macromolecular organic structural material more resistant to liquid chemicals than the polydimethylsiloxane, bonded to the elastomer and selected from the class consisting of polytrifluorochloroethylene and polytetrafluoroethylene said gasket having closed path grooves and closed path ridges on substantially all extended surfaces of the gasket to provide corrugated surfaces longitudinal of the gasket, whereby deformation of the gasket under normal compressive forces flexes portions of the corrugated nonelastic sheathing into a projected area different from that covered by the undeformed gasket.

2. A gasket as set forth in claim 1 wherein the sheathing is polytrifluorochloroethylene.

3. A gasket as set forth in claim 1 wherein the sheathing is polytetrafluoroethylene.

References Cited in the file of this patent

UNITED STATES PATENTS

| | | |
|---|---|---|
| 2,597,976 | Cousings | May 27, 1952 |
| 2,647,773 | Berner | Aug. 4, 1953 |
| 2,717,025 | Jelinek | Sept. 6, 1955 |

FOREIGN PATENTS

| | | |
|---|---|---|
| 173,852 | Germany | July 26, 1906 |
| 661,265 | Germany | Aug. 1, 1938 |

OTHER REFERENCES

Product Engineering Magazine for April 1946, pp. 304–306. (Copy in 288 S. R.)

Product Engineering Magazine for February 1947, pp. 146–150. (Copy available in Pat. Off. 288 S. R.)